United States Patent [19]

Kiker

[11] Patent Number: 5,020,966

[45] Date of Patent: Jun. 4, 1991

[54] PALLET DISPENSER/ACCUMULATOR

[76] Inventor: Donald E. Kiker, 2410 Richelieu La., Birmingham, Ala. 35216

[21] Appl. No.: 296,945

[22] Filed: Jan. 17, 1989

[51] Int. Cl.⁵ ............................................. B65G 60/00
[52] U.S. Cl. ................................ 414/797.5; 414/795.2; 414/933
[58] Field of Search ...................... 414/927, 933, 795.2, 414/797.5; 221/236, 298, 299

[56] References Cited

U.S. PATENT DOCUMENTS

| | | | |
|---|---|---|---|
| 3,884,366 | 5/1975 | Leenaards | 414/933 X |
| 4,015,732 | 4/1977 | Beaty, Jr. et al. | 414/927 X |
| 4,764,074 | 8/1988 | Postigo | 414/927 X |

Primary Examiner—Robert J. Spar
Assistant Examiner—Janice Krizek

[57] ABSTRACT

A simplified and improved apparatus for handling pallets. The apparatus includes a self aligning storage magazine, a three pneumatic cylinder stack/destack device and a standard live roller conveyor as a pallet transport device. The purpose for this apparatus is to automatically stack or destack wood, metal, or plastic pallets in a manner requiring fewer mechanical components.

1 Claim, 3 Drawing Sheets

PALLET DISPENSER/ACCUMULATOR

BACKGROUND OF THE INVENTION

The present invention relates to pallet dispensing and/or accumulating apparatus. The intent of this invention is to offer a device to handle pallets in a more reliable and simpler fashion than with previous art. Pallet jams and mechanical failures of previous art plagued users with the need for near constant operator attention and maintenance.

SUMMARY OF THE INVENTION

This invention was conceived to offer a mechanically simple apparatus with as few moving parts as possible. Great attention was given to areas of problems in previous art. The storage magazine offers several conveniences for pallet loading. The magazine structure surrounds the entire pallet stack for proper stack alignment. The structure incorporates a back stop and a flanged entry port. These features automatically align the pallets as they are loaded into the magazine. The pallet entry probes were as small in diameter as possible, as well as tapered to enter out of tolerance and damaged pallets, reducing the possibility of jams.

The lift actuation is accomplished by an arrangement of two pneumatic cylinders, each with a different stroke length, mounted end to end This arrangement offers three accurate stop positions from only two pneumatic cylinders. Again, adding to the simplicity and ease of any necessary maintenance. The horizontal probe travel is actuated by a single pneumatic cylinder. The probes are contained and slid be means of bushings in the probe guides. The transport conveyor is a standard chain driven live roller conveyor. The end result is a very reliable apparatus capable of handling pallets with jam-free efficiency along with a minimum amount of maintenance.

DRAWING LEGEND

Figure 1:
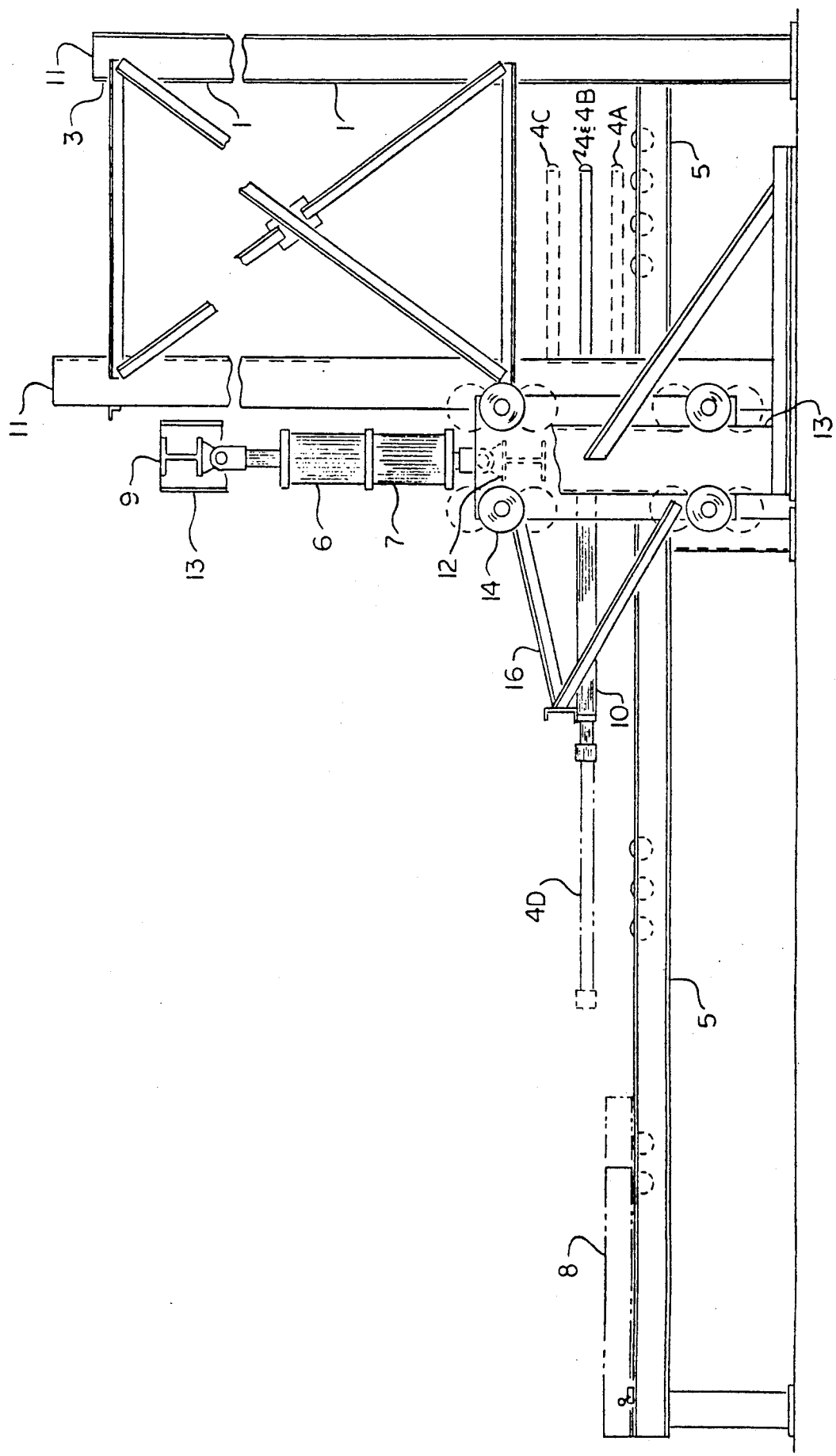
FIG. 1 is a general arrangement and overall view of the pallet dispenser/accumulator and take away conveyor.

1. Storage magazine structure
2. Flanged backstop
3. Flanged pallet entry structure
4. Retractable lift probes
4A. Probe lower position
4B. Probe mid position
4C. Probe upper position
4D. Probe in retracted position
5. Power roller conveyor
6. Pneumatic cylinder "A"
7. Pneumatic cylinder "B"
8. Pallet staged for immediate use
9. Stationary lift support
10. Probe guide tubes with replaceable bushings
11. Adjustable inner magazine for various pallet sizes
12. Vertical travel lift support
13. Stationary vertical support and wheel guide track with replaceable wear guide
14. Lift load bearing flanged wheels
15. Vertical travel plate with wheels and lift beam
16. Probe support structure
17. Pneumatic cylinder "C" for probe actuation
18. Pallets in storage

DETAILED DESCRIPTION OF A PREFERRED EMBODIMENT OF THE INVENTION

Figure 2:
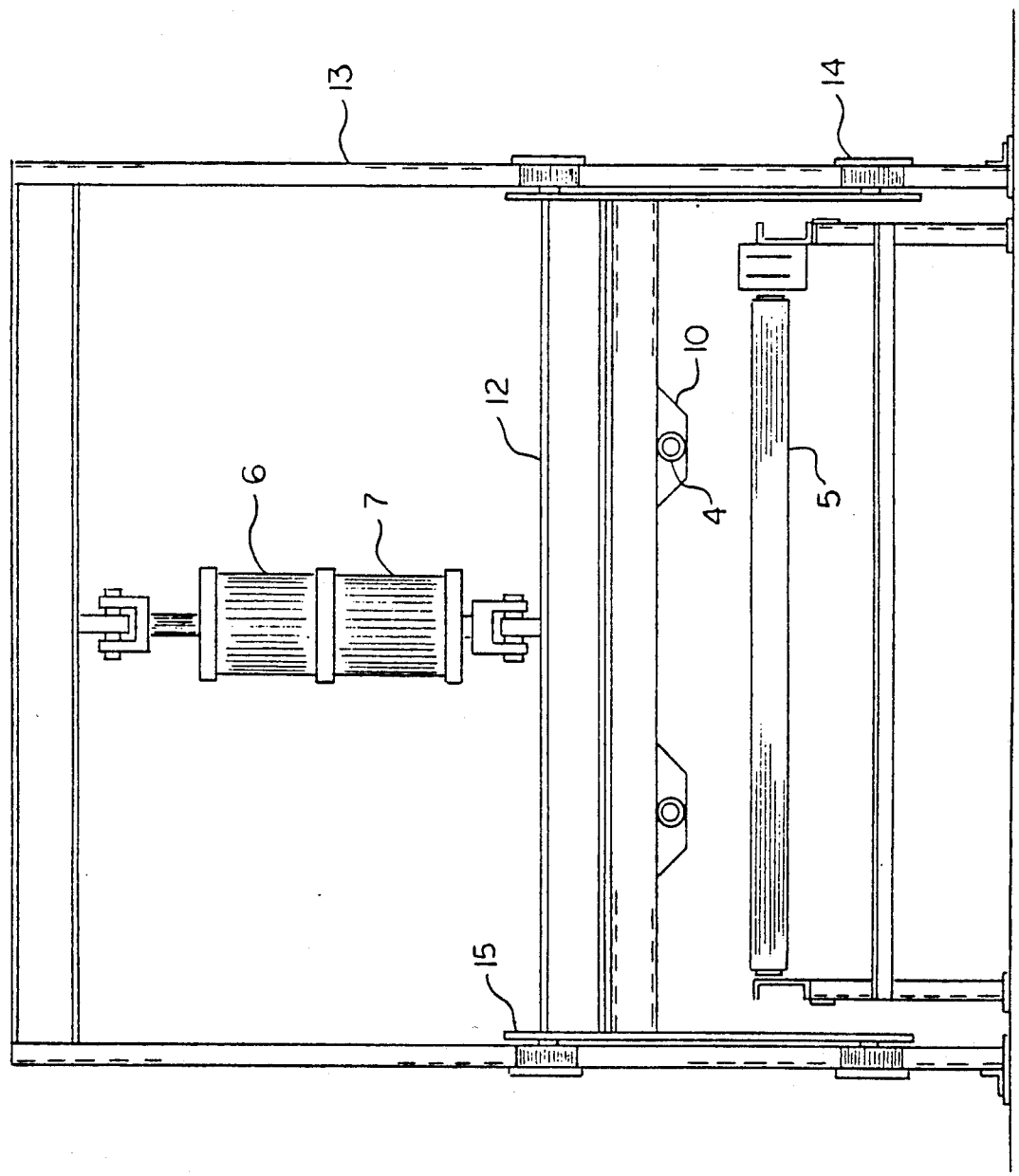
FIG. 2 is an end view of the stacker device and conveyor.
Figure 3:
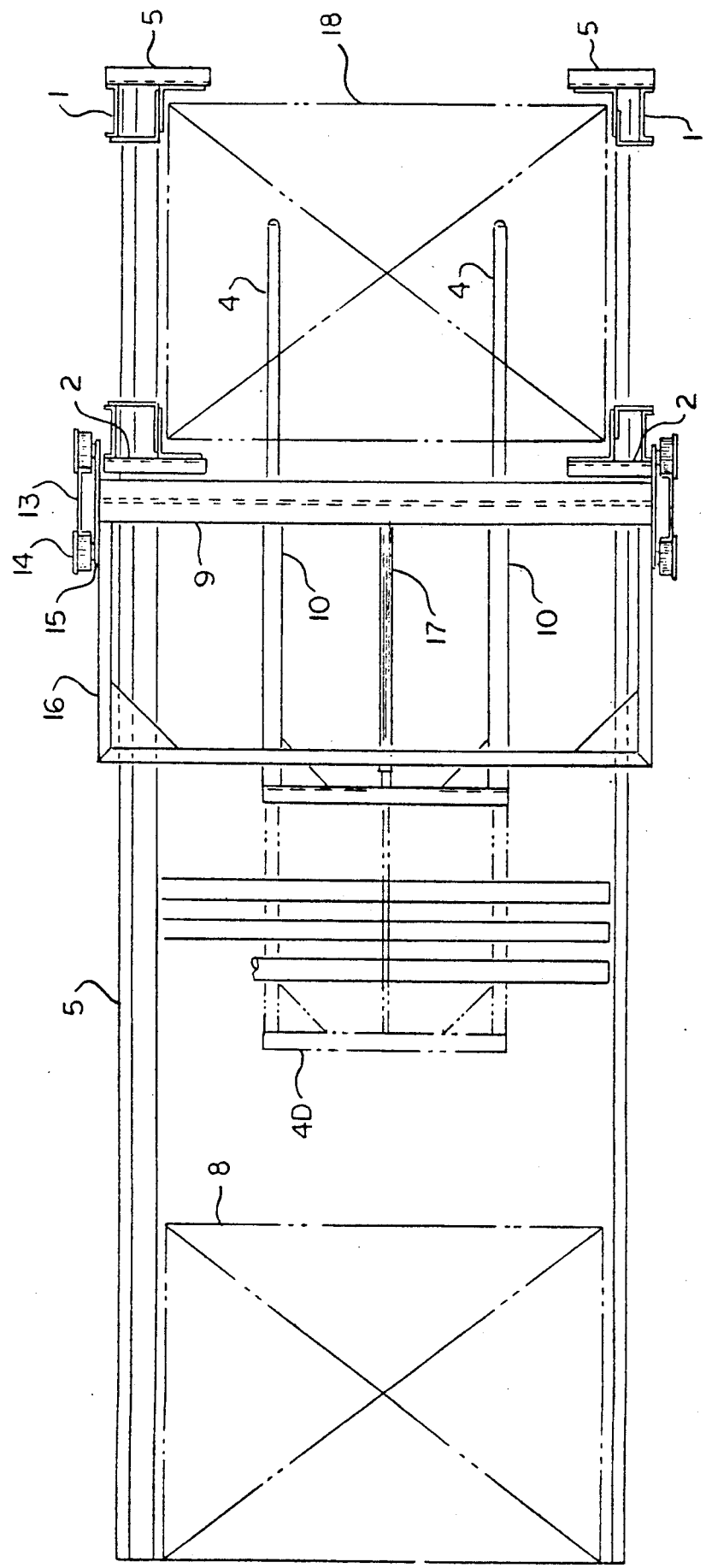
FIG. 3 is a plan (overhead) view of the general arrangement (FIG. 1).

Referring to FIGS. 1, 2, and 3. A pallet dispenser/accumulator for automatic destacking or stacking pallets.

The storage magazine is comprised of four structural members (1). Placed to capture each of four pallet corners. Pallets are loaded into the top of the storage magazine and are individually dispensed from the bottom of the magazine. A flanged backstop (2) and flanged entry support structure (3) are used in assisting the load operator in inserting pallets in proper alignment.

The retractable probes (4) move from home position (4D) into mid position (4B) inside the second pallet from the bottom. The bottom most pallet is at rest on the power roller conveyor (5).

The lift cylinders (6 & 7) are both retracted, bringing the probes into their uppermost position (4C) lifting all pallets in the stack off of the bottom pallet.

The power roller conveyor (5) is energized, transporting the bottom pallet to the pallet stage position (8) ready for loading.

The lift cylinders (6 & 7) extend, lowering the entire stack of pallets to the roller conveyor (5). With the pallet stack now supported by the conveyor (5), the probes (4) retract (4D), cylinder "B" (7) retracts bringing the proves (4) to the mid position (4B). The probes (4) then move into the second pallet from the bottom. Cylinder "A" (6) retracts, lifting the pallet stack off the lowermost pallet resting on the conveyor (5). The conveyor (5) is energized, starting the cycle again.

I claim:

1. A pallet dispenser and accumulator comprising a storage magazine for a stack of pallets, at least one probe insertable into a pallet, a probe support and guide structure mounting the probe for vertical movement, a first pneumatic cylinder for horizontally moving the probe, second and third pneumatic cylinders mounted end to end and connected to the probe support and guide structure for vertically moving the probe and a roller conveyor, whereby a pallet is dispensed from the bottom of the stack by atuating the second and third pneumatic cylinders to lower the stack onto the roller conveyor, actuating the first pneumatic cylinder to retract the probe from engagement with a bottom pallet in the stack, the second pneumatic cylinder is actuated to raise the probe into position to engage the second pallet from the bottom of the stack, the first pneumatic cylinder is actuated to insert the probe into the second pallet from the bottom of the stack, the third pneumatic cylinder is actuated to raise the pallet stack off the bottom pallet and the roller conveyor is actuated to remove the pallet from underneath the stack.

* * * * *